United States Patent
Bux et al.

(10) Patent No.: US 12,246,375 B2
(45) Date of Patent: Mar. 11, 2025

(54) METHOD, CASTING MOLD, AND APPARATUS FOR PRODUCING A VEHICLE WHEEL

(71) Applicant: ENTEC-STRACON GMBH, Aalen (DE)

(72) Inventors: Ralf Bux, Aalen (DE); Friedrich Klein, Aalen (DE)

(73) Assignee: ENTEC-STRACON GmbH, Aalen (DE)

( * ) Notice: Subject to any disclaimer, the term of this patent is extended or adjusted under 35 U.S.C. 154(b) by 0 days.

(21) Appl. No.: 18/047,274

(22) Filed: Oct. 17, 2022

(65) Prior Publication Data

US 2023/0112141 A1    Apr. 13, 2023

Related U.S. Application Data

(63) Continuation-in-part of application No. 16/646,563, filed as application No. PCT/EP2018/074299 on Sep. 10, 2018, now abandoned.

(30) Foreign Application Priority Data

Sep. 11, 2017  (DE) .................. 10 2017 008 497.1
Apr. 16, 2018  (DE) .................. 10 2018 003 077.7
(Continued)

(51) Int. Cl.
*B22D 17/10*    (2006.01)
*B22D 18/08*    (2006.01)
(Continued)

(52) U.S. Cl.
CPC .......... *B22D 21/002* (2013.01); *B22D 18/08* (2013.01); *B22D 30/00* (2013.01); *B60B 3/06* (2013.01)

(58) Field of Classification Search
CPC .......... B22C 9/28; B22D 17/10; B22D 17/22; B22D 17/2218; B22D 17/30; B22D 18/04;
(Continued)

(56) References Cited

U.S. PATENT DOCUMENTS 6,763,879 B1    7/2004   Macheske et al.
7,770,627 B2    8/2010   Wang et al.
(Continued)

FOREIGN PATENT DOCUMENTS

CN    1127174 A    7/1996
CN    1874861 A    12/2006
(Continued)

OTHER PUBLICATIONS

"New Ways of Light-Metal Rim Production," Giesserei-Praxis, 2001, Special 1-22.
(Continued)

*Primary Examiner* — Kevin P Kerns
(74) *Attorney, Agent, or Firm* — Umair A. Qadeer

(57) ABSTRACT

A method for producing a vehicle wheel from a light metal material is disclosed herein. The light metal material is introduced in liquid form into a mold cavity of a casting mold and pressurized casting is then used to produce the vehicle wheel. The casting mold is temperature-controlled, where different regions of the casting mold are maintained at different temperatures. An apparatus that includes the disclosed casting mold is also described herein.

5 Claims, 12 Drawing Sheets

(30) Foreign Application Priority Data

Jun. 19, 2018 (DE) .................... 10 2018 004 819.6
Jun. 20, 2018 (DE) .................... 10 2018 004 857.9

(51) Int. Cl.
*B22D 21/00* (2006.01)
*B22D 27/04* (2006.01)
*B22D 30/00* (2006.01)
*B60B 3/06* (2006.01)

(58) Field of Classification Search
CPC ........ B22D 18/06; B22D 18/08; B22D 21/00;
B22D 21/002; B22D 27/04; B22D 30/00
USPC ........ 164/113, 119, 122, 125, 126, 128, 305
See application file for complete search history.

(56) References Cited

U.S. PATENT DOCUMENTS

| | | | |
|---|---|---|---|
| 8,016,019 | B2 | 9/2011 | Shibata et al. |
| 2017/0120322 | A1 | 5/2017 | Zhu et al. |

FOREIGN PATENT DOCUMENTS

| | | | |
|---|---|---|---|
| CN | 101720263 | A | 6/2010 |
| CN | 102386708 | A | 3/2012 |
| CN | 102463344 | A | 5/2012 |
| CN | 103302264 | A | 9/2013 |
| CN | 204685993 | U | 10/2015 |
| CN | 205362612 | U | 7/2016 |
| CN | 105880508 | A | 8/2016 |
| CN | 205437093 | U | 8/2016 |
| CN | 106513622 | A | 3/2017 |
| DE | 9421365 | U1 | 11/1995 |
| EP | 0691166 | A1 | 1/1996 |
| EP | 0710515 | A1 | 5/1996 |
| EP | 1970143 | A2 | 9/2008 |
| EP | 1970146 | A1 | 9/2008 |
| EP | 2643110 | B1 | 1/2015 |
| JP | S60238075 | A | 11/1985 |
| JP | S63278636 | A | 11/1988 |
| JP | H01237067 | A | 9/1989 |
| JP | 2006035268 | | 2/2006 |
| WO | 2003045609 | A2 | 6/2003 |
| WO | 2004007119 | A1 | 1/2004 |
| WO | 2009043192 | A2 | 4/2009 |

OTHER PUBLICATIONS

Wang, Y.-C., et al. "Numerical Simulation of Low Pressure Die Casting of Magnesium Wheel," Int. J. Adv. Manuf. Technol. 2007, 32, 257-64.

Barz, J., et al. "Entlüftungssysteme für Vakuum Druckguss" ("Venting Systems for Vacuum Die Casting").

Brunhuber, E. "Praxis der Druckgussfertigung" ("Die Casting Production Practice"), Fachverlag Schiele & Schön GmbH, 1980, 28-41, 48-49, 258-75 & 306-09.

Nogowizin, B. "Theorie und Praxis des Druckgusses" ("Theory and Practice of Die Casting"), Schiele & Schön, 2011, 685-723.

Schumacher, P., et al. "Untersuchung zur Kühlwirkung in Durckgussformen" ("Investigation of the Cooling Effect in Die Casting Molds"), Wolfgang Gössl, 2011.

"Untersuchung zur Kühlwirkung in Durckgussformen" ("Investigation of the Cooling Effect in Die Casting Molds"), Wolfgang Gössl, 2011, Abstract.

METHOD, CASTING MOLD, AND APPARATUS FOR PRODUCING A VEHICLE WHEEL

CROSS-REFERENCE TO RELATED APPLICATIONS

This application is a continuation-in-part of U.S. patent application Ser. No. 16/646,563, filed on Mar. 11, 2020, which is the U.S. national phase of PCT Patent Application No. PCT/EP2018/074299, filed on Sep. 10, 2018, which claims priority to German Provisional Patent Application Serial Nos. 10 2018 004 857.9, filed on Jun. 20, 2018, 10 2018 004 819.6, filed on Jun. 19, 2018, 10 2018 003 077.7, filed on Apr. 16, 2018, and 10 2017 008 497.1, filed on Sep. 11, 2017, the disclosures of which are hereby incorporated herein in their entireties by reference.

BACKGROUND

Field of the Invention

The present disclosure relates to methods for producing vehicle wheels, and casting molds and apparatuses therefor.

Description of the Related Art

Wheels composed of light metal materials allow for lower weight wheels, with the end goal of enhancing driving safety and comfort. Both lightweight wheel designs and the use of lightweight metals have been explored to further this goal. Cast or forged wheels made of aluminum or magnesium alloys are currently considered state-of-the-art lightweight wheels. A very high percentage of these are produced using low-pressure chill casting or permanent mold casting processes.

In addition to considerations regarding driving dynamics, designing wheels that are more aerodynamic and crash-resistant has also become increasingly important. The aerodynamic properties of wheels are directly related to fuel consumption and $CO_2$ emissions. Legislative and regulatory requirements also support an increased focus on lightweight wheel designs.

Standard casting processes such as low-pressure chill casting cannot optimally meet these requirements with respect to process engineering.

In cold-chamber casting processes with conventional cold-chamber casting systems for the production of cast parts, the systems build up a clamping force by generating a lock through a clamping unit consisting of three machine plates, namely a machine shield, a movable clamping plate, and a fixed clamping plate, four columns along which the movable clamping plate can be moved back and forth, and a drive unit for driving the movable clamping plate, usually via a hydraulically driven toggle lever or double toggle lever. A casting mold is sampled with a movable mold half on the movable clamping plate and with a fixed mold half on the fixed clamping plate. The necessary locking force is applied via the clamping unit by clamping the columns between the machine shield and the fixed clamping plate.

In conventional cold-chamber casting systems, the fixed clamping plate is followed in the axial direction by a casting unit. A melt is fed to a mold cavity formed by the casting mold perpendicular to the parting plane, i.e., perpendicular to the parting plane of the two mold halves, via a casting chamber through the fixed clamping plate and the fixed mold half of the casting mold. For this purpose, the casting unit is typically equipped with a hydraulically driven casting plunger that can be moved in the casting chamber. An ejector unit is integrated into the clamping unit behind the movable clamping plate, which is typically also hydraulically driven to move ejector pins back and forth in the casting mold. The ejector pins are passed through the movable clamping plate to scrape the cast parts from the moving half of the casting mold after opening the casting mold. In addition, a core pulling device is usually provided, which on the machine side consists of hydraulic cylinders, for example, which are usually mounted on the moving clamping plate, and sometimes also on the fixed clamping plate.

It is well understood that the casting process in cold-chamber casting plants is divided into four successive phases, namely the dosing phase, the pre-filling phase, the mold-filling phase, and the post-pressing phase.

The dosing or metering phase can, for example, be carried out mechanically with a spoon or with compressed gas from a holding furnace via a channel or via a riser pipe, as in the Vacural process. The dosing times are typically between 3 s and 15 s, depending on the type and quantity of dosing. If the dosing time is relatively long, there is a risk that part of the melt will already solidify in the casting chamber. Depending on the machine design, the plunger speed in the pre-filling phase can typically be adjusted in a range between 0.2 m/s and 0.6 m/s so that the melt is conveyed as quickly as possible and air inclusions are also avoided to the extent possible, e.g., by overturning of a wave of the melt building up in front of the plunger, by the formation of spray, and/or by reflection in the casting residue area.

In the pre-filling phase, the casting chamber is filled with melt and the plunger conveys the melt up to the vicinity of the ingate.

To avoid cold flow points, the mold filling phase is as short as possible; its duration is usually between 5 ms and 60 ms. In the mold-filling phase, the plunger moves the melt at high speed, typically adjustable in a range of up to 10 m/s and more. At the end of the mold-filling phase, high pressures occur by converting the kinetic energy into a pressure pulse, so that there is a risk of the mold tearing. Modern casting machines therefore have means to absorb the kinetic energy towards the end of the filling phase.

In the post-pressing phase or holding-pressure phase of a cold chamber casting machine, a holding pressure of 300 bar to 1500 bar, and in some cases even more, is usually set via a multiplier. The melt solidifies under the holding pressure and air trapped during mold filling is compressed under the static holding pressure. The proportion of air trapped under the holding pressure in the volumetric porosity is low. The volumetric porosity usually consists of blowholes, the cause of which is insufficient replenishment of a shrinkage-related portion of the melt at the transition from liquid to solid.

In conventional cold-chamber casting systems, the ingates are generally thin-walled in relation to the wall thickness of the cast parts, which means that the melt is still liquid in some areas of the cast part, while it has already partially or completely solidified in the ingate area, which makes further feeding impossible or at least difficult. The formation of a solidified rim shell in the casting chamber after dosing or metering leads to the fact that part of the melt is neither available for filling the casting mold nor for feeding the shrinkage-related portion in the mold cavity. Pressing residual melt out of the casting residue area for replenishment requires a high holding pressure.

The high pressures at the end of the mold-filling phase and in the holding-pressure phase require high holding forces of the casting mold, which must be applied via the clamping unit of the casting machine.

High casting forces lead to elastic deformation of the casting mold and possibly to a bulge around the mold cavity, which can cause burr formation around the cast part in the parting plane as well as in the areas of slides and slide guides.

The high pressures require a relatively thick fixed clamping plate and consequently a correspondingly long casting chamber, which in turn limits the filling level in the casting chamber to typically between about 15% to about 70%, with a correspondingly large air volume in the casting chamber. The conventional orientation of the casting unit relative to the clamping unit results in relatively long flow paths of the melt in the casting chamber and in the casting system and often a cranking of the casting system or the anvil. The application of high pressures can also lead to elastic deformation of the solidified casting residue and the casting chamber in the casting residue area and thus to jamming of the casting residue in the casting chamber, so that under certain circumstances high opening forces are required to tear the casting residue out of the casting chamber. This can lead to a high and/or premature wear of the casting chamber and the plunger. In addition, jamming of the casting residue in the casting chamber often results in the application of an excessive amount of piston lubricant, which can lead to inclusions in the cast part.

Horizontally arranged casting chambers are heated more in the lower area than in the upper area during filling by the hot melt, so that the thermal load causes a deformation of the casting chamber, causing friction between the casting chamber and the casting piston, which must follow the course of the casting chamber in the pre-filling phase and the mold-filling phase. The conventional orientation of the casting chamber relative to the mold or barrel causes a vertical deflection of the melt at the transition from the casting chamber to the mold or barrel in the parting plane, which is problematic both thermally and in terms of flow mechanics. Any deflection of the melt leads to turbulence during mold filling, to a higher energy requirement in the casting drive, and to the risk of noticeable air inclusions and erosion in the area of the casting set and the casting mold.

The system-related disadvantages of conventional cold chamber casting systems described above worsen the casting result and require a very stable and cost-intensive machine design. In addition, due to the overall design of conventional casting machines, the clamping of the casting mold is a time-consuming and cost-intensive process.

DE 1290672 A describes a die for die casting machine consisting of an ejector die half and a cover die half, in which one die half is divided into a core-like center piece and a die plate.

DE 1302161 A also describes similar system.

JP H01237067 A describes the prevention of a casting defect by varying the thermal conductivity of a casting mold according to the thickness of a wheel to be cast.

DE 9421365 U1 describes a light alloy wheel for motor vehicles and a device for its manufacture.

U.S. Pat. No. 6,763,879 discloses a mold temperature control system comprising a mold section having a cavity, a fluid circuit for distributing a stream of a conditioning fluid, and a temperature sensor disposed in the mold.

U.S. Patent Application Publication No. 2017/0120322 provides a water-cooled mold for casting aluminum alloy wheels and a manufacturing method thereof. The water-cooled mold is provided with water-cooling channels of a first type having high heat exchange efficiency and water-cooling channels of a second type having low heat exchange efficiency.

Sprue or gate systems are known which are typically relatively flat to achieve the lowest possible reworking requirement. However, such a design is disadvantageous for the flow of molten material, since this design of the runner system can result in very high flow velocities of the molten material and associated tearing of the casting front, which can lead to poor or defective components, especially in the case of vehicle wheels. In die casting processes in particular, and the casting molds used in these processes, a gate with a very small and flat cross-section is usually used.

Thus there remains a need for a method and a casting mold for producing a vehicle wheel from a light metal material that satisfies the requirements of lightweight construction, aerodynamics, and crash properties.

SUMMARY

A method of producing a vehicle wheel from a light metal material is disclosed herein. A light metal material is introduced in liquid form into a mold cavity of a casting mold. The material may preferably be introduced via a gate region adjoining the mold cavity. A vehicle wheel is then produced using pressurized casting, where the casting mold is tempered to different temperatures in different areas and where the light metal material is in a liquid (i.e., molten) state and is introduced into the mold cavity at a casting piston speed of more than 5 m/s. Preferably, a ratio or modulus between the smallest cross-sectional area of the gate region and the volume of the mold cavity is at least 0.6 $mm^2/cm^3$.

A casting mold for producing a vehicle wheel from a light metal material is also disclosed herein. The casting mold includes mold parts that form a mold cavity for receiving the light metal material in liquid form. The casting mold further includes tempering devices that temper different areas to different temperatures.

An apparatus for producing a vehicle wheel that includes the disclosed casting mold is also disclosed herein.

A vehicle wheel produced using the disclosed method, casting wheel, and/or apparatus is also disclosed herein. This vehicle wheel may have geometries which are not realizable with known processes. For example, substantially thinner or more filigree structures can be produced. For example, a substantially larger number of spokes can be achieved than in known vehicle wheels.

DETAILED DESCRIPTION

Figure 1:
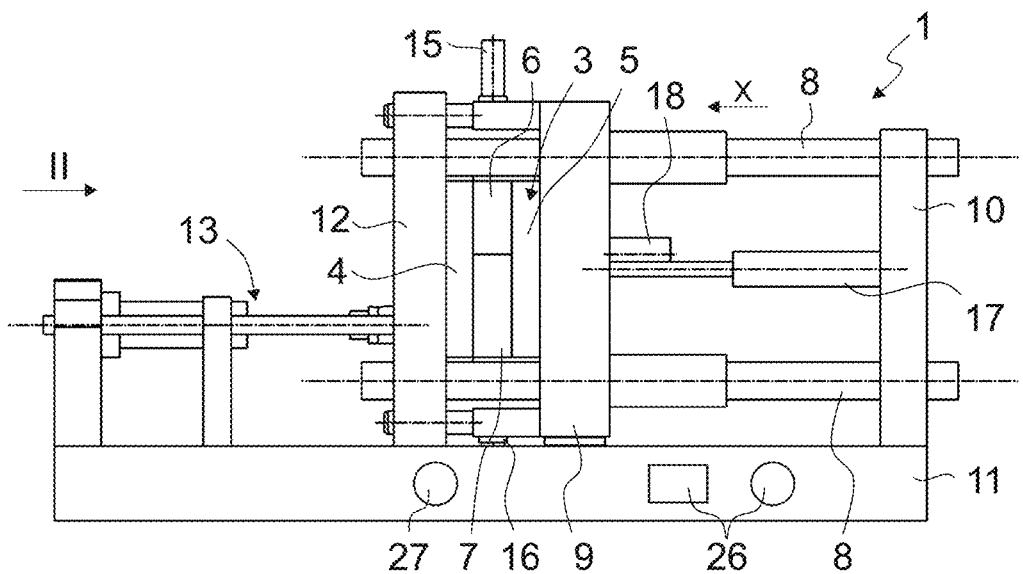
FIG. 1 is a side view of an embodiment of the disclosed apparatus in a first state.

A method of producing a vehicle wheel from a light metal material is disclosed herein. A light metal material is introduced in liquid form into a mold cavity of a casting mold. The material may preferably be introduced via a gate region adjoining the mold cavity. A vehicle wheel is then produced using pressurized casting, where the casting mold is tempered to different temperatures in different areas and where the light metal material is in a liquid (i.e., molten) state and is introduced into the mold cavity at a casting piston speed of more than 5 m/s. Preferably, a ratio or modulus between the smallest cross-sectional area of the gate region and the volume of the mold cavity is at least 0.6 mm$^2$/cm$^3$.

In addition to low machine and tool requirements, the disclosed method satisfies the desired wheel construction, aerodynamics, and crash properties for wheels generated thereby. By using pressurized casting instead of low-pressure chill casting or conventional cold-chamber casting, it is possible to implement various lightweight construction optimizations, aerodynamic optimizations, and crash properties optimizations.

Instead of using low-pressure chill casting, with its limited possibilities with respect to casting cross-section and quality of the casting result due to high tool temperatures of over 500° C., using pressurized casting enables process optimization and the generation of vehicle wheel designs with lightweight construction.

Temperature control of the casting mold leads to a very fast and complete filling of the mold cavity, whereby segregation of the liquid light metal material is avoided. This enables a desired temperature level within the mold cavity, so that, in addition to avoiding uneven heating of the casting mold, the associated deformation of the casting chamber is avoided and thus the premature solidification of the molten light metal material in certain areas is prevented. In addition to increasing the service life of the pistons and the casting mold, this also reduces the piston forces.

By using pressurized casting and tempering the casting mold in different areas to different temperatures, the forces that are observed during the casting process are relatively much lower, resulting in low-turbulence or turbulence-free casting of the vehicle wheel. Although the advantages of the cold-chamber casting process for the production of light metal wheels are also maintained in the pressurized casting process, the problems otherwise resulting from the cold-chamber casting process are avoided.

Furthermore, the method allows very small wall thicknesses of up to 1 mm in certain areas of the vehicle wheel and sometimes even less. The possible reduction of wall thicknesses makes it possible to design a vehicle wheel that has significantly better properties than known vehicle wheels with respect to crash behavior. In particular, the vehicle wheel produced with the disclosed method can be optimized for desired crash behavior.

Due to such thin wall thicknesses, the visible side of the vehicle wheel can be designed to be almost completely closed without significantly increasing the weight of the vehicle wheel. This can significantly improve the aerodynamics of the vehicle wheel. Of course, openings, for example for ventilating a vehicle brake, can also be integrated into such a visible side. A structure increasing the strength of the vehicle wheel can be located within such a disc-like design of the visible side. This means that, compared to known solutions, significant improvements can also be achieved in the aerodynamics of the vehicle wheel manufactured using the disclosed method.

The disclosed method also allows for a low draft angle of up to 1 degree or less, which opens up previously unknown stylistic design possibilities for the vehicle wheel. Furthermore, very fine surfaces with a very small radius of 1 mm or less can be generated.

Since the vehicle wheel can be finished in one casting, the machining required after casting is reduced by approximately 80% or more. The reduced post-processing requirements mean that less waste is produced. The disclosed method considerably reduces the casting time and enables a virtually burr-free casting, while also requiring less raw material and energy. Further, the rapid casting and solidification with casting skin means that otherwise necessary artificial aging can be completely or partially eliminated. Vehicle wheels produced with the disclosed method have a low distortion, which also allows the fine gradations required for bright turning.

The lightweight construction achievable with the disclosed method increases the range of motor vehicles equipped with such vehicle wheels, which contributes to a reduction of environmental burdens.

With regard to rapid filling of the mold cavity and the associated uniform solidification of the liquid light metal material, it is particularly advantageous that the molten light metal material is introduced into the mold cavity at a casting piston speed of more than 5 m/s. If the piston speed is lower than 4 m/s, cold flow fronts occur, resulting in partially inhomogeneous or incomplete filling of the mold, and thus the method cannot be properly utilized.

The ratio between the smallest cross-sectional area of the gate region immediately before entry into the mold cavity and the volume of the overall mold cavity, i.e., the volume of the actual mold cavity and the volume of the gate and overflow, ensures that the molten material enters the mold as uniformly as possible and also flows through it in a steady manner. This uniform flow results in an extremely low-turbulence, quasi-laminar or quiescent casting process in which break-up of the casting front and associated spraying or tearing of the casting front are prevented to the extent possible. At the same time, at a suitable speed, this makes it possible to achieve very rapid mold filling. The molten material is therefore not accelerated in this way, which also prevents an unnecessary increase in casting pressure that could otherwise lead to casting defects. The replenishment required for complete filling of the mold is also better ensured in this way.

The ratio between the smallest cross-sectional area of the gate region immediately before entry into the mold cavity and the volume of the overall mold cavity can also be referred to as a modulus, as described in more detail below.

The very short mold filling times of, for example, 40 to 70 ms, preferably 50 to 60 ms, with a maximum flow velocity of the molten material of up to 70 m/s, can ensure a fine microstructure and high strength of the vehicle wheel produced with the disclosed casting mold.

Using the disclosed method for casting the vehicle wheel, it is therefore possible to configure the mold filling and the targeted solidification within the mold cavity in conjunction with the solidification time in such a way that the structural and strength properties of the vehicle wheel are improved.

In some preferred embodiments, if in areas in which the vehicle wheel has a small cross-section the casting mold is tempered to high temperatures and in areas in which the vehicle wheel has a large cross-section the casting mold is tempered to low temperatures, it is ensured that the melt remains liquid for a sufficiently long time in relatively narrow areas of the mold cavity to prevent premature solidification of the same and that in relatively wide areas of the mold cavity solidification begins within a reasonable amount of time. Overall, this results in uniform solidification of the entire vehicle wheel to be cast.

It may also be provided that a venting area, in which the casting mold is vented, is tempered to a much lower temperature than the other areas of the casting mold. This ensures rapid solidification of the melt in the venting area, which prevents the melt from escaping from the casting mold. In addition, this also allows the liquid light metal material to solidify in a compact design, despite venting, even at high casting speeds.

In some preferred embodiments, the ratio or modulus may be at most $1.4 \text{ mm}^2/\text{cm}^3$. By limiting the ratio between the smallest cross-sectional area of the gate region and the volume of the mold cavity, i.e., the modulus, incorrect dimensioning of the gate system is avoided, thus ensuring the cost-effectiveness of using the disclosed method.

In some highly preferred embodiments, the molten material flows through the mold cavity at a velocity of more than 15 m/s. Such a high flow velocity of the molten material within the mold cavity allows for the production of very thin cross-sections, since the filling of the mold is ensured despite the mold having a significantly lower temperature. If the speed of the molten material through the mold cavity is higher than 70 m/s, the casting front may crack and the molten material may start to spray, which may lead to cold flow points and leads to inhomogeneity. The desired speed of the molten material through the mold cavity leads to a certain speed of the piston as mentioned above.

A casting mold for producing a vehicle wheel from a light metal material is also disclosed herein. The casting mold includes mold parts that form a mold cavity for receiving the light metal material in liquid form. The casting mold also includes a gate region which adjoins the mold cavity and via which the liquid material can be fed to the mold cavity to form the vehicle wheel. The casting mold further includes tempering devices that temper different areas to different temperatures. Preferably, a ratio or modulus between the smallest cross-sectional area of the gate region and the volume of the mold cavity is at least $0.6 \text{ mm}^2/\text{cm}^3$.

The disclosed casting mold enables a very simple adjustment of different temperature ranges within the casting mold through the use of the tempering devices, so that the vehicle wheel to be cast can be produced under the optimum conditions in each instance. The casting mold can have a relatively simple design and is always kept at the set temperatures by the tempering devices.

The ratio or modulus between the smallest cross-sectional area of the gate region and the volume of the mold cavity may preferably be at most $1.4 \text{ mm}^2/\text{cm}^3$.

Further, to avoid an undesired acceleration of the molten material within the gate region, the cross-sectional area of the gate region, viewed in the main flow direction of the molten material, may also be designed to be constant or to increase.

In some preferred embodiments, the cross-sectional area of the mold cavity, starting from the gate region, is constant or increasing when viewed in the main flow direction of the molten material up to a depth of at least 60% of the total depth of the mold cavity. In this way, a constant velocity of the molten material is ensured in the major part of the mold cavity, whereas an acceleration of the molten material is permitted in the region of the mold cavity remote from the gate region. Such acceleration of the molten material is particularly advantageous in the production of vehicle wheels, since the region remote from the gate region often contains comparatively narrow cross-sections in which there is a risk of premature, unwanted solidification. The acceleration of the molten material permitted in these regions, and thus the higher speed of the same, prevents such unwanted solidification from occurring and results in homogeneous solidification of the entire vehicle wheel.

In some preferred embodiments, the tempering devices are pressurized water circuits, electric heating cartridges, and/or pressurized oil circuits to enable setting of desired temperatures at the transition of the casting mold into the mold cavity.

If the mold parts and/or inserts connected to the mold parts and/or venting elements consist of different materials, the heat outflow and/or heat inflow can be readily controlled.

In some embodiments, the tempering devices are in operative connection with a control device for controlling and/or regulating the temperatures of the tempered areas. In this way, the temperatures of the individual areas of the mold cavity or casting mold can be readily controlled or regulated.

In some embodiments, the casting mold is composed of at least two mold parts movable relative to each other.

In some preferred embodiments, at least one of the mold parts has a plurality of tuning elements for adjusting the mold part to different temperatures acting on the casting mold. At least one of the mold parts and thus the entire casting mold can thereby be very well tuned with respect to the matching of individual components, since the tuning elements are suitable for compensating tolerances between the individual components of the casting mold. This also allows the casting mold to be used at temperatures other than those for which it was designed, thus significantly reducing costs. The tuning elements can also be made of different materials and can compensate for the different sizes of the components involved depending on the production of the molded part and the heat input of the molded part. In addition to the size compensation, the tuning elements can either insulate the heat or transfer the heat in a targeted manner, so that in addition to the molding production and the molding heat input, the different sizes are compensated and an insulating effect is achieved or heat is transferred. In addition to size compensation, the tuning elements are also capable of absorbing and/or damping the shocks and/or forces introduced.

To prevent the melt from escaping through the venting of the casting mold, a surface change in the form of a tempered labyrinth-like structure and/or at least one change in cross-section and/or at least one deflection may be provided in a venting region of the mold cavity of the casting mold.

An apparatus for producing a vehicle wheel that includes the disclosed casting mold is also disclosed herein.

The apparatus, which may, for example, be in the form of a casting machine, can be used particularly advantageously for performing the disclosed method.

To achieve a simple and safe opening and closing of the casting mold, at least one of the mold parts of the casting mold may be movable in the closing direction of the casting mold relative to another mold part. This may be achieved using at least one guide element that is not part of the casting mold. In this way, it is also possible to avoid additional guides within the casting mold and to move the mold parts of the casting mold without such guides. By arranging the guide elements inside the apparatus and not inside the casting mold, the guide elements can be used for the different casting molds, so that considerable cost savings can be achieved. In addition, in this way straightforward casting mold changes, i.e., changes of the mold parts of the casting mold, are facilitated.

In some preferred embodiments, the mold parts are thermally separated from guide elements moving the same. This prevents excessive heating of the guide elements so that they cannot warp and promotes a high degree of accuracy in the movement of the components of the apparatus and the avoidance of disturbances.

In some preferred embodiments, at least two of the mold parts are movable using respective gripping elements in a direction perpendicular to the closing direction. This allows a very fast opening and closing of the casting mold, which can considerably increase the productivity of the apparatus.

A simple and quick connection of the mold parts with the guide and/or gripping elements results when at least one of the mold parts can be connected to the at least one guide element and/or to the gripping elements using a quick-connect system.

To be able to supply and/or operate the tempering devices in an effective manner, respective units for supplying the tempering devices may be integrated into the apparatus.

In some preferred embodiments, at least one vacuum unit is provided for extracting air from the mold cavity. This vacuum unit enables the air to be removed from the mold cavity quickly and easily in order to fill the mold cavity with liquid light metal material.

A vehicle wheel produced using the disclosed method, casting wheel, and/or apparatus is also disclosed herein. This vehicle wheel may have geometries which are not realizable with known processes. For example, substantially thinner or more filigree structures can be produced. For example, a substantially larger number of spokes can be achieved than in known vehicle wheels.

Examples are described below that illustrate embodiments of the casting mold and apparatus.

FIGS. 1-9 show different views of an apparatus 1 for producing a vehicle wheel 2 shown in FIGS. 6-9 using a pressurized casting method. The vehicle wheel 2 can be of any size and shape. The vehicle wheel 2 shown in FIGS. 6-9 is therefore to be regarded as purely exemplary. A light metal material is used for the pressurized casting of the vehicle wheel 2, preferably an aluminum or magnesium material. For this purpose, light metal materials known in the art and suitable for the method described below can be used for the production of the vehicle wheel 2.

Figure 2:
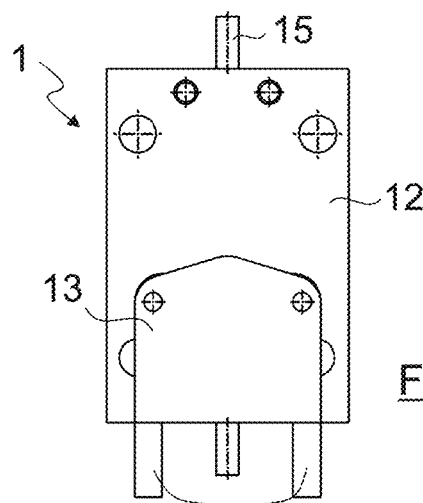
FIG. 2 is a view according to arrow II of FIG. 1.
Figure 3:
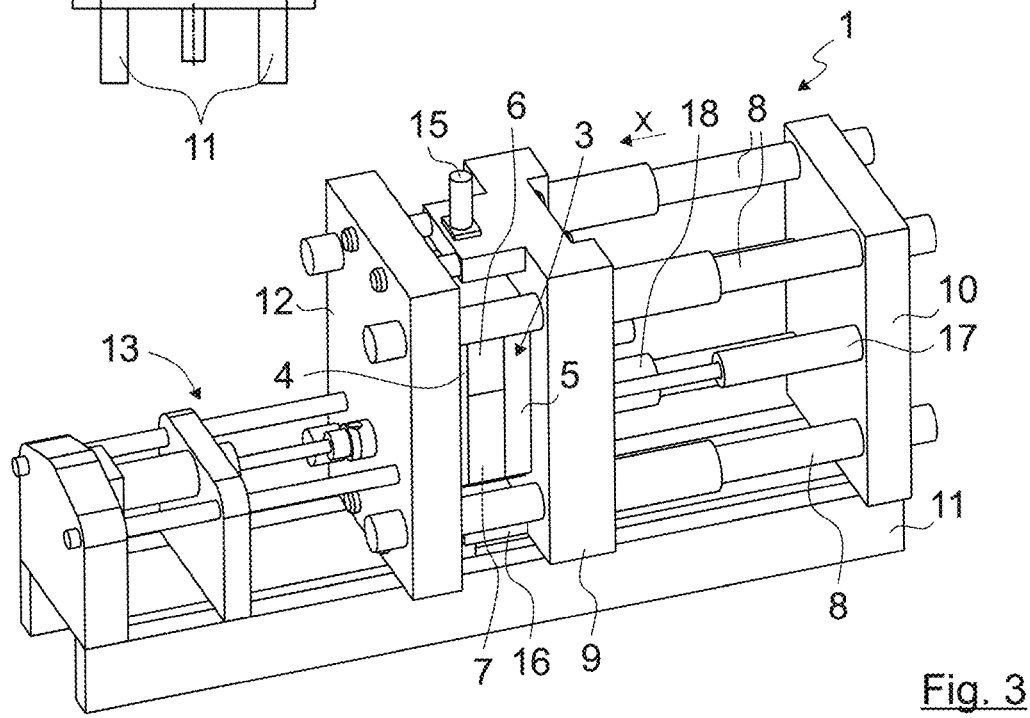
FIG. 3 is a perspective view of the apparatus of FIG. 1.

The apparatus 1 has a casting mold 3, which in the representation of FIGS. 1-3 is in a closed position. As shown, the casting mold 3 has four mold parts, namely a rigid or immobile mold half 4, a movable mold half 5, an upper slide 6, and a lower slide 7. The mold parts of the casting mold 3 can be accommodated with or without a zero point system and they can have a very smooth and high-quality surface which does not need to be treated with a coating or the like, or only to a very limited extent, resulting in a very high surface quality of the vehicle wheel 2. The casting mold 3 can also have more than the four mold parts described and illustrated herein. The movable mold parts, i.e., the movable mold half 5, the upper slide 6, and the lower slide 7, can be brought from the state shown in FIGS. 1-3 to the states shown in FIGS. 4-9 by using the respective guide elements described below. All of these guide elements described below are part of the apparatus 1 and are not part of the casting mold 3.

For guiding the movement of the movable mold half 5 in the closing direction of the casting mold 3, marked with the arrow x in FIG. 1, and against this closing direction x, several horizontally running guide columns 8 are used, which are mounted on one side on a movable clamping plate 9 and on the other side on a rear machine shield 10, which forms a counter bearing. By moving the movable clamping plate 9, which is also a guide element for the casting mold 3, against the closing direction x, the movable mold half 5 is brought from its position shown in FIG. 1 to the position shown in FIG. 4. When the movable mold half 5 is moved relative to the rigid mold half 4, the upper slide 6 and the lower slide 7 are also moved against the closing direction x relative to the rigid mold half 4. Drive devices known in the art and not shown herein can be used to drive the movable clamping plate 9, which in this case is movably mounted on rails 11 of apparatus 1. The guide columns 8 form a guide for the movable clamping plate 9 and absorb the horizontal clamping forces during casting. The rigid mold half 4 is attached to a fixed clamping plate 12 which is connected to a casting unit 13 which serves to introduce the liquid light metal material into a mold cavity 14 formed between the mold parts of the casting mold 3, which in a known manner comprises the negative mold of the vehicle wheel 2 to be produced. The filling of the mold cavity 14 with the liquid light metal material takes place in particular from the outer circumference of the mold cavity 14. The casting mold 3 is preferably designed in such a way that spraying of the material is avoided when the liquid light metal material is introduced into the mold cavity 14. The liquid light metal material is introduced into the mold cavity 14 at a relatively low pressure of up to 100 bar or slightly more.

During the actual casting process, the movable clamping plate 9 and the fixed clamping plate 12, on which the movable clamping plate 9 is supported, also generate the clamping force. For this purpose, the drive elements or devices used to move the movable clamping plate 9 can, for example, have hydraulic cylinders and/or toggle lever elements or mold closing elements. The casting mold 3 can be clamped by means of manual, semi-automatic, or fully automatic clamping elements via form fit and/or frictional connection. The fixed clamping plate 12 can have a mold spraying device (not shown) and/or an integrated pressure medium system.

Figure 4:
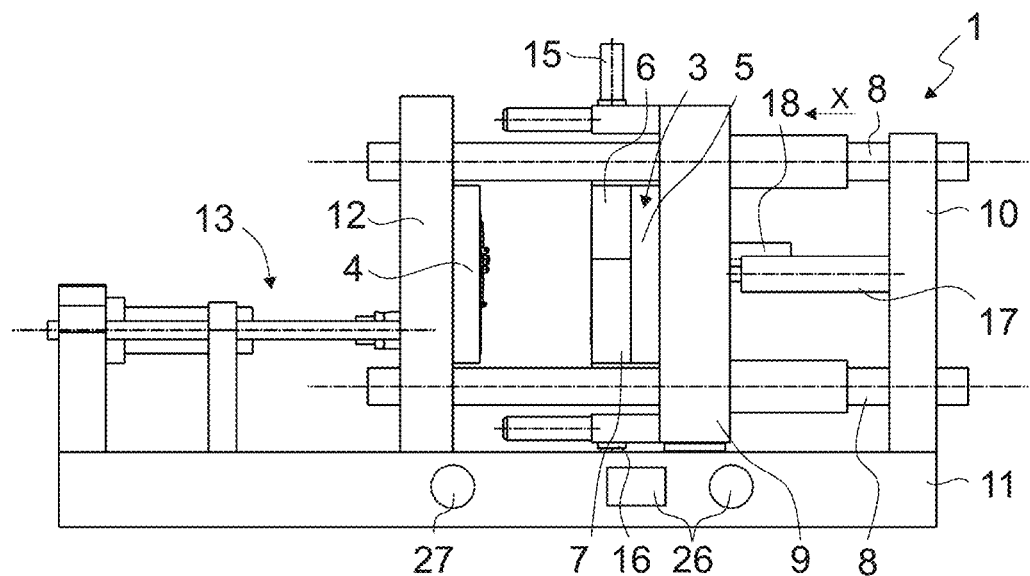
FIG. 4 is a side view of the apparatus of FIG. 1 in a second state.
Figure 5:
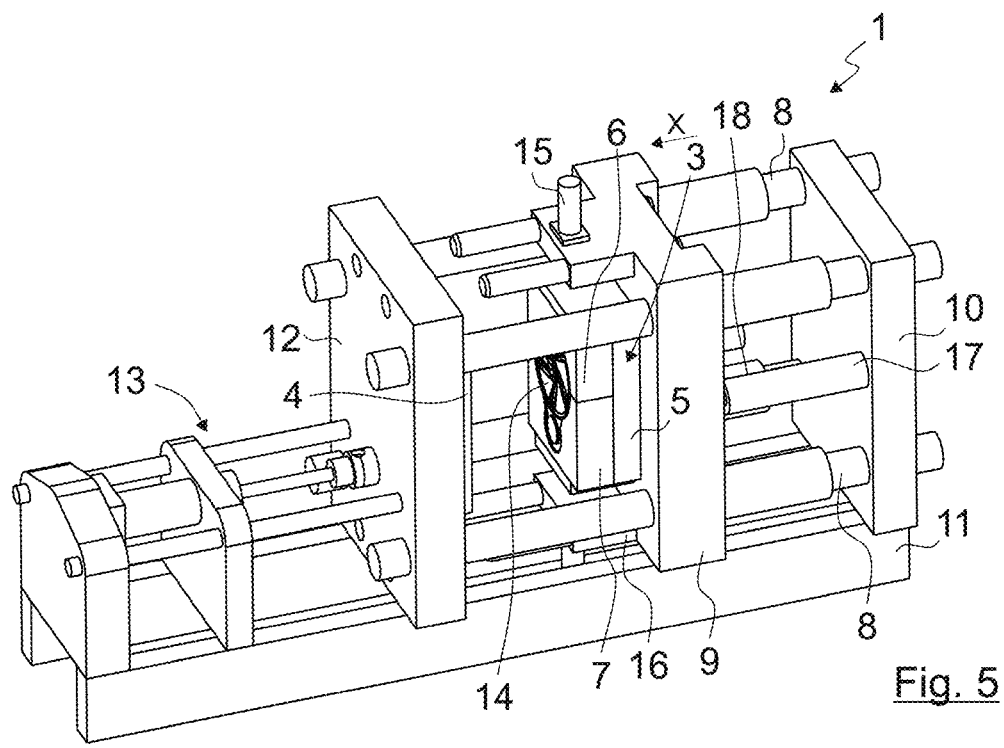
FIG. 5 is a perspective view of the apparatus of FIG. 4.
Figure 6:
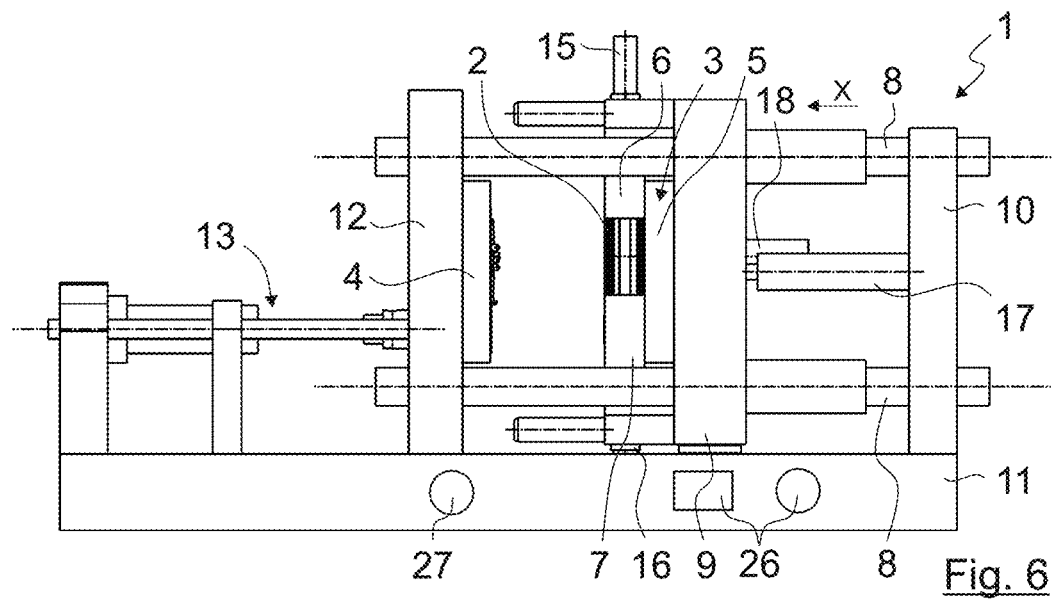
FIG. 6 is a side view of the apparatus of FIG. 1 in a third state.
Figure 7:
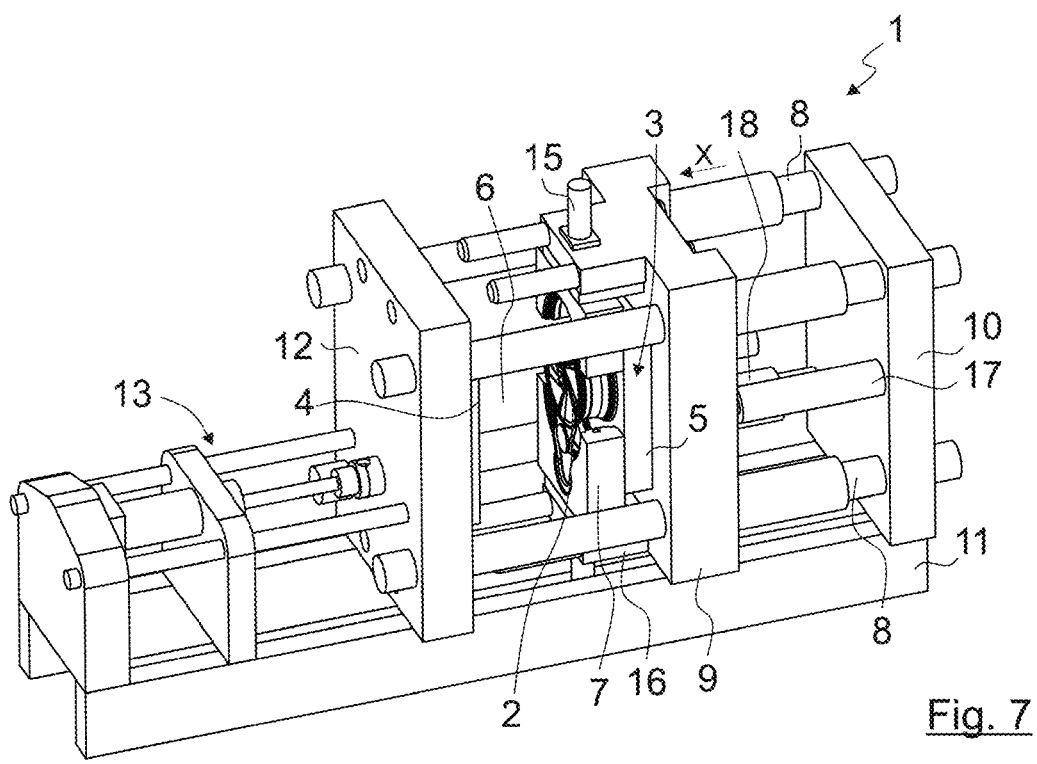
FIG. 7 is a perspective view of the apparatus of FIG. 6.
Figure 8:
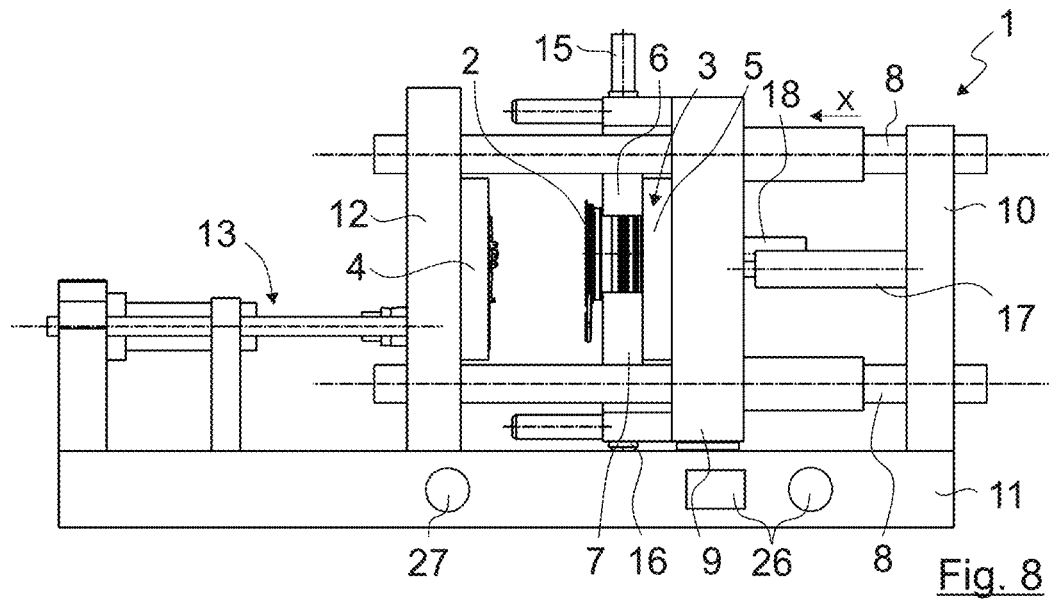
FIG. 8 is a side view of the apparatus of FIG. 1 in a fourth state.
Figure 9:
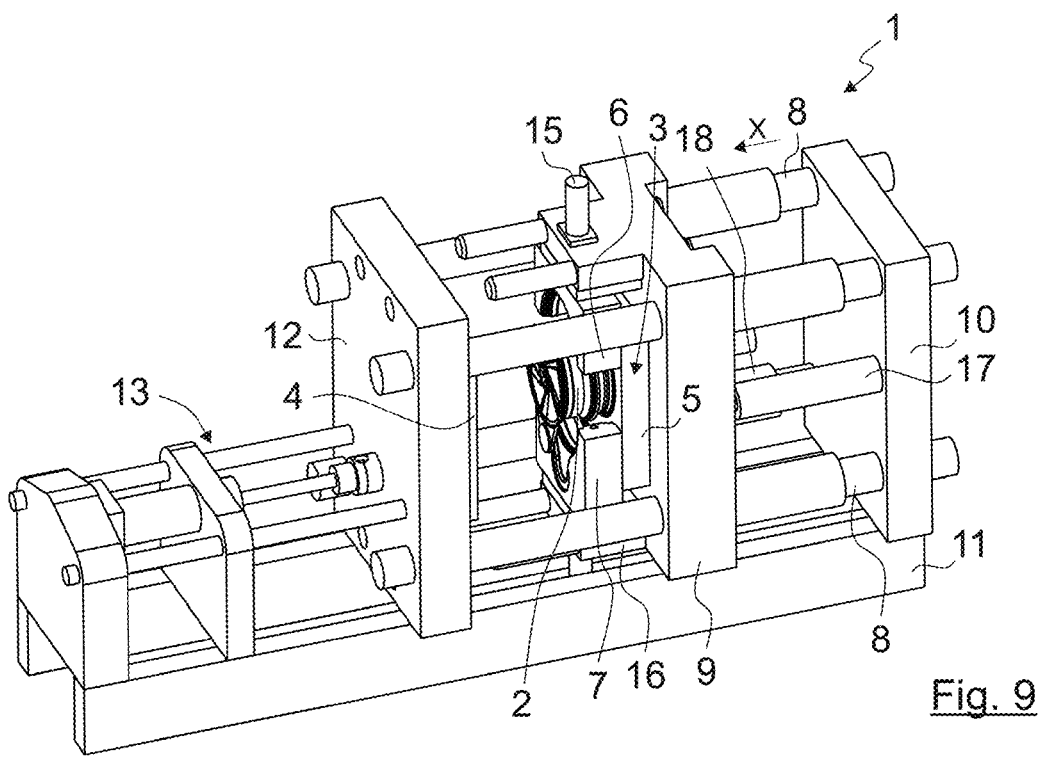
FIG. 9 is a perspective view of the apparatus of FIG. 8.

The upper slide 6 can be moved from its position shown in FIG. 1 or FIG. 4 to the position shown in FIG. 6, in which the upper slide 6 has been moved vertically upwards relative to the movable mold half 5 using an upper gripping element 15. In a similar way the lower slide 7 can also be moved downwards using a lower gripping element 16 from its position shown in FIGS. 1 and 4 to its position shown in FIG. 6 relative to the movable mold half 5. The gripping elements 15 and 16 and the movable clamping plate 9 can be operated manually, semi-automatically, or fully automatically. The gripping elements 15 and 16 also function as guide elements for the casting mold 3. The guide elements for moving the mold parts of the casting mold 3 can also be equipped with a pressure medium in a way not shown.

While in the embodiment shown the upper slide 6 and the lower slide 7 are moved in the vertical direction, it would also be possible to separate the casting mold 3 in the area of the two slides 6 and 7 in the vertical direction and thus move the two slides in the horizontal direction. The gripping elements 15 and 16 would be left and right gripping elements in such embodiments. Preferably, the two slides 6 and 7 are moved using the respective gripping elements 15 and 16 in a direction perpendicular to the closing direction x.

In the method for the production of the vehicle wheel 2 carried out with the apparatus 1 and the casting mold 3, the light metal material is thus introduced in liquid form into the mold cavity 14 of the casting mold 3 by the casting unit 13. This introduction of the liquid light metal material takes place at a high casting piston speed of more than 5 m/s. This high speed is achieved by a corresponding movement of a piston of the casting unit 13 (not shown). The vehicle wheel 2 is produced using pressurized casting, whereby the casting mold 3 is tempered to different temperatures in different areas. Preferably, in areas in which the vehicle wheel 2 has a small cross-section the casting mold 3 is tempered to high temperatures, and in areas in which the vehicle wheel 2 has a large cross-section the casting mold 3 is tempered to low temperatures. The temperature control of the casting mold 3 allows the solidification behavior of the liquid light metal material to be controlled or adjusted, although the vehicle wheel 2 has very different cross-sections. In addition, an area in which the casting mold 3 is vented is tempered to a much lower temperature than the other areas of the casting mold 3. This area in which the casting mold 3 is vented will be described in more detail below.

The mold parts of the casting mold 3, i.e., the rigid mold half 4, the movable mold half 5, the upper slide 6, and the lower slide 7, can consist entirely or partially of different materials. In particular, the materials of the individual mold parts can be selected depending on the temperatures to be set when the casting mold 3 is tempered.

After the liquid light metal material has solidified, the mold parts are moved apart in the manner described above to open the casting mold 3. Ejection of the cast part produced by the method, i.e., the vehicle wheel 2, is performed by an ejector unit 17 which, like the guide columns 8, is mounted on the movable clamping plate 9 and on the rear machine shield 10. As shown, the ejector unit 17 has a hydraulic unit 18, which ensures the movement of the ejector unit 17 in a known manner. After ejection of the vehicle wheel 2 from the casting mold 3, the casting mold 3 can be moved in the opposite direction, i.e., from the state shown in FIGS. 8-9 via the state shown in FIGS. 6-7 and the state shown in FIGS. 4-5 to the state shown in FIGS. 1-3, to produce the next vehicle wheel 2 by introducing the liquid light metal material into the mold cavity 14.

After completion, the represented vehicle wheel 2 may be connected to a tire (not shown) to be filled with air or another gas. The vehicle wheel 2 can also consist of several individual parts, which can also be produced using the method described herein.

Figure 10:
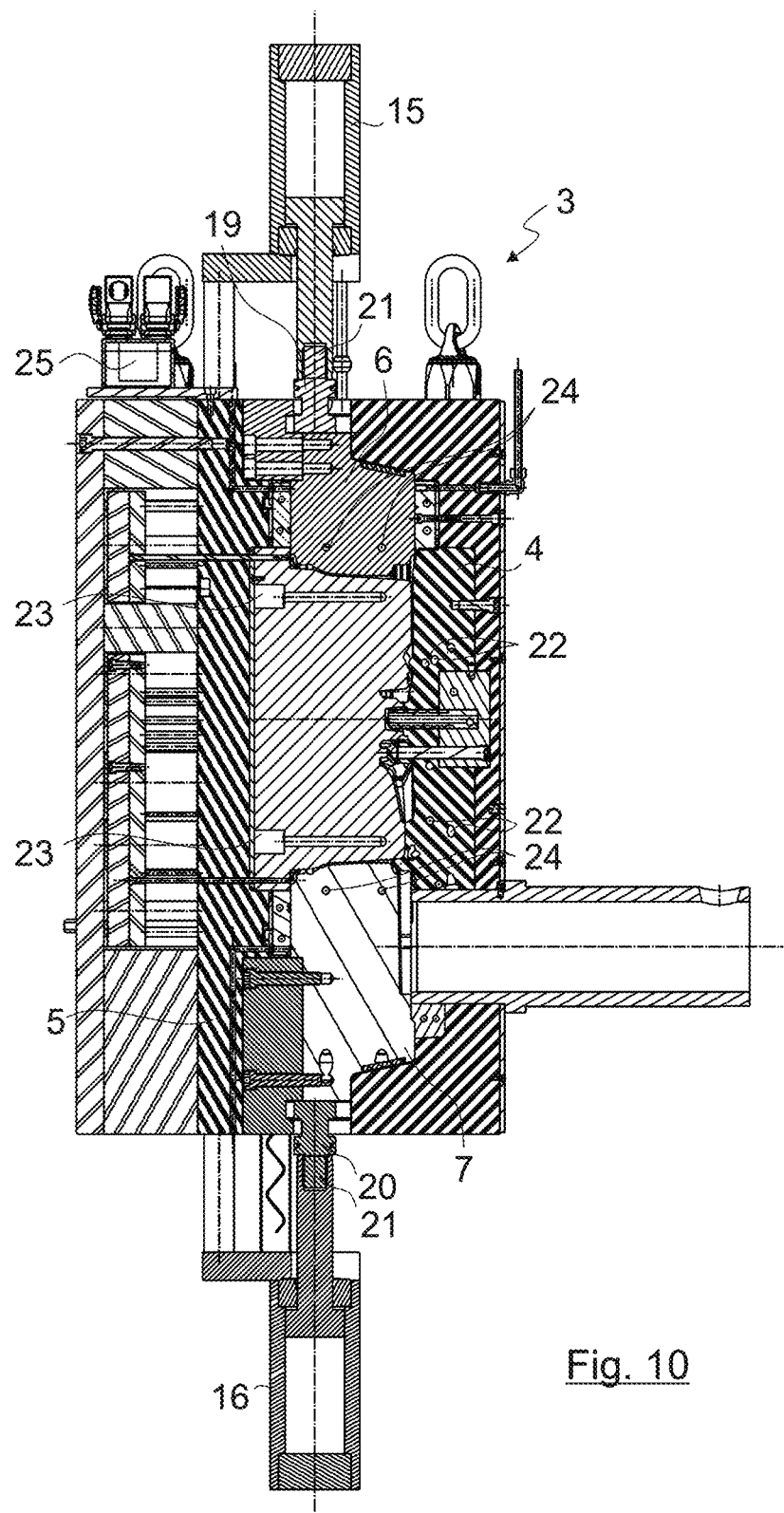
FIG. 10 is an embodiment of the disclosed casting mold.
Figure 11:
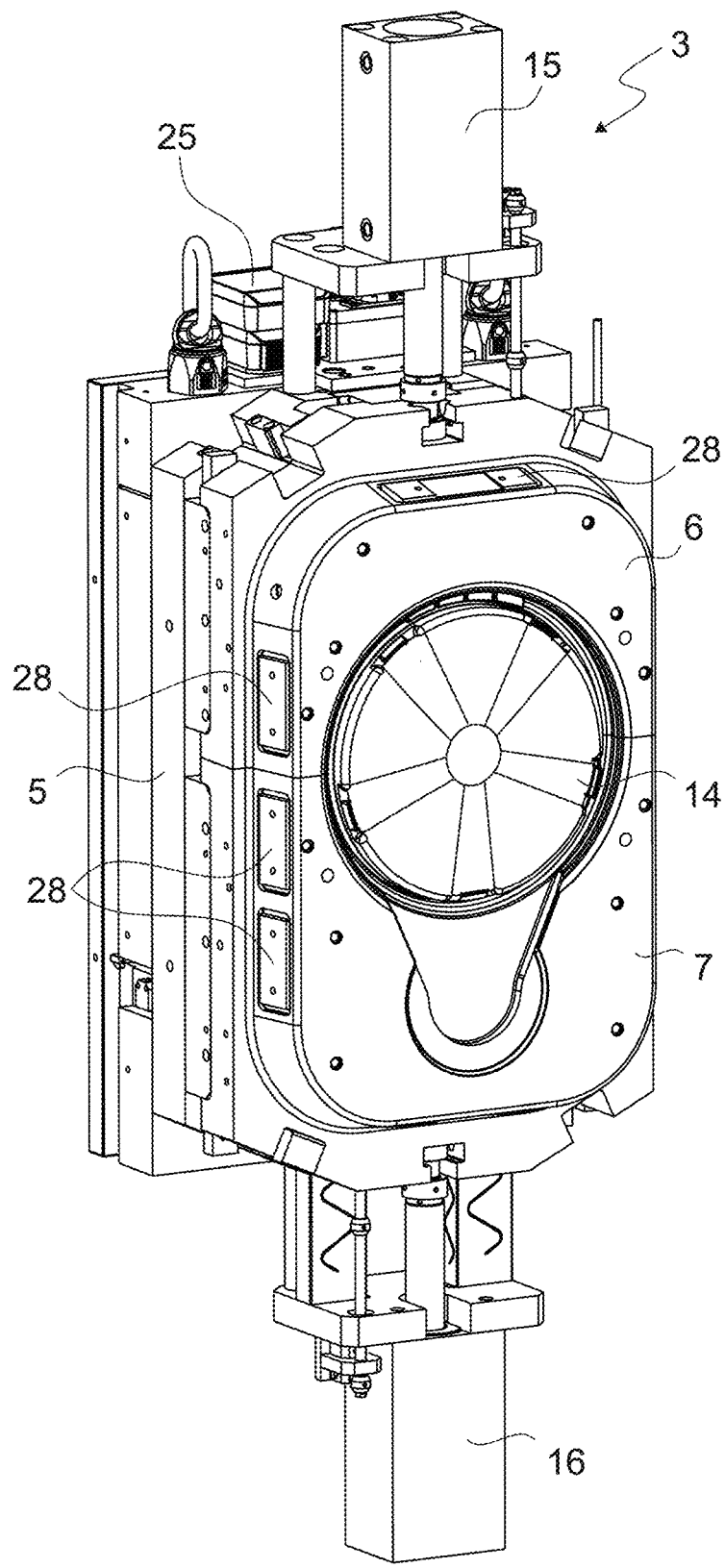
FIG. 11 is a further view of a part of the disclosed casting mold.
Figure 12:
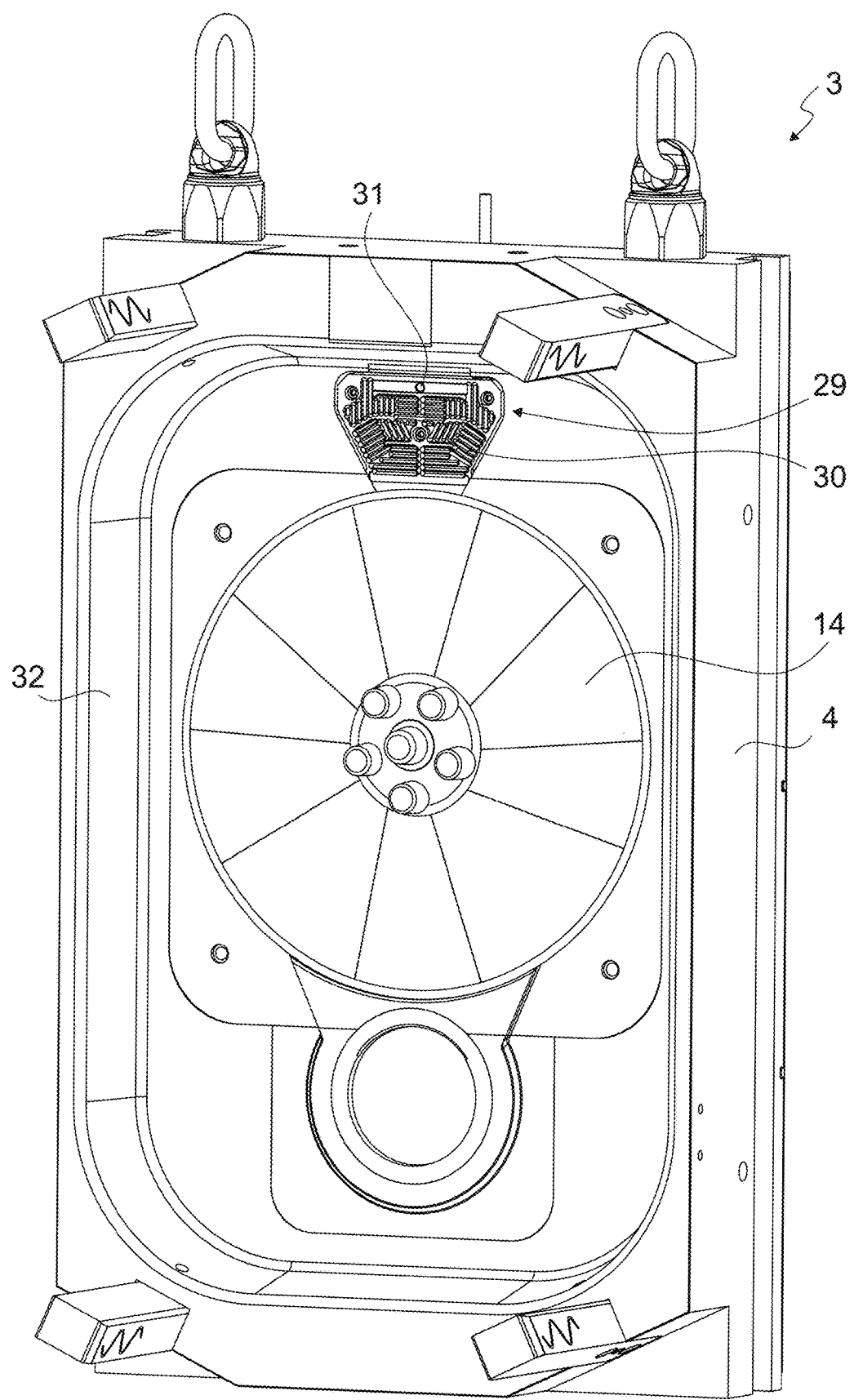
FIG. 12 is another view of a part of the disclosed casting mold.

FIGS. 10-12 show an exemplary embodiment of the casting mold 3, showing the rigid mold half 4, the movable mold half 5, the upper slide 6, and the lower slide 7. The upper gripping element 15 and the lower gripping element 16 are also shown. FIG. 10 also shows that the upper slide 6 and the lower slide 7 are connected to the upper gripping element 15 and the lower gripping element 16 respectively by means of quick-connect elements 19 and 20, which makes it possible to quickly connect the guide elements of the apparatus 1 with the mold parts of the casting mold 3 to ensure quick opening and closing of the casting mold 3 by moving the mold parts relative to each other as described above.

In addition, FIG. 10 shows that the upper slide 6, the lower slide 7, and the movable mold half 5 are thermally separated from the corresponding guide elements, i.e., the upper gripping element 15, the lower gripping element 16, and the movable clamping plate 9. Corresponding insulating elements 21 are provided for this purpose, not all of which are visible due to the course of the sectional view and which may also be provided between the rigid mold half 4 and the fixed clamping plate 12. This thermal separation of the mold parts from the guide elements prevents unintentional heating of the guide elements, so that the apparatus 1 is functional in terms of opening and closing of the casting mold 3 even in the event of temperature changes.

FIG. 10 also shows several tempering devices that allow the casting mold 3 to be tempered to different temperatures to enable uniform solidification of the light metal material within the mold cavity 14. The tempering devices are preferably pressurized water circuits, of which several holes 22 are shown in FIG. 10, electric heating cartridges 23, and pressurized oil circuits, of which several holes 24 are also shown in FIG. 10. If necessary, other heating or cooling elements can also be used as tempering devices.

The tempering devices, i.e., the pressurized water circuits, the electric cartridge heaters 23, and/or the pressurized oil circuits are connected to a control device 25, also shown in FIG. 10, so that the temperatures of the areas that are temperature controlled by the tempering devices can be controlled and/or regulated. The control device 25 can also be in operative connection with temperature sensors (not shown), which measure the actual temperature of the individual parts of the casting mold 3 and thus enable the temperature to be set correctly. The control device 25 is also capable of monitoring the temperatures of the molded part or of the molding zones in addition to other process data and/or geographical data and/or other monitoring information and transmitting them to a higher-level system, for example a machine control system. In this way, the casting mold 3 can be specifically tempered during production and/or for preheating, whereby all influencing parameters, such as different thermal expansions of the components involved, can be monitored and controlled based on the different temperatures and thermal expansion coefficients of the mold parts.

The temperature control of the casting mold 3 can be designed differently for each individual mold and thus for each individual vehicle wheel 2 to be produced with the casting mold 3 or the apparatus 1.

FIGS. 1, 4, 6, and 8 show schematically units 26, which are used to supply the temperature control units for the temperature control of the casting mold 3 and which are integrated in the apparatus 1. As shown, the units 26 are shown as being integrated in the rails 11. However, the units 26 can alternately also be located or attached at other positions within the apparatus 1.

Furthermore, FIGS. 1, 4, 6, and 8 show a vacuum unit 27, which is used to extract air from mold cavity 14. The vacuum unit 27, which generates a corresponding vacuum, is also integrated into the apparatus 1 and is shown as an example in the rails 11. The connection of the units 26 with the tempering devices and the connection of the vacuum unit 27 with the mold cavity 14 are not shown in the figures; these connections can be achieved in a variety of known ways.

FIG. 11 shows a perspective view of a part of the casting mold 3, in which the upper slide 6, the lower slide 7, the movable mold half 5, the control device 25, and a part of the mold cavity 14 can be seen. The gripping elements 15 and 16 and their connection to the slides 6 and 7 is shown in FIG. 11. Further, FIG. 11 shows that at least one of the moldings, as shown the upper slide 6 and the lower slide 7, has several tuning elements 28 that may be used to match or tune the moldings to each other. As shown, the slides 6 and 7 are matched to the rigid mold half 4 (not shown in FIG. 11) via the tuning elements 28. This compensates for tolerance deviations that inevitably occur during the manufacture of the individual mold parts. Further, the tuning elements 28 may be used to adjust the mold parts of the casting mold 3 to different temperatures acting on the casting mold 3. The tuning elements 28, which can also be denominated as insert parts, can be made of a different material than the slides 6 or 7 in or on which they are arranged.

The tuning elements 28, which have variable thicknesses and can also be designed as tuning cylinders if necessary, may be used to tune the casting mold 3 in such a way that all mold parts of the mold remain closed even under bursting pressure to prevent the liquid light metal material from escaping. In this way, the mold parts of the casting mold 3 can be adjusted in a way that account for the technological and economic requirements for the production of specific vehicle wheels 2. The tuning elements 28 can also be reworked or exchanged after appropriate testing, so that a secure sealing of the casting mold 3 is guaranteed.

FIG. 12 shows a view of another mold part of the casting mold 3, namely the rigid mold half 4, which has a venting area 29 adjoining the mold cavity 14, through which the air inside the mold cavity 14 at the start of the casting process can escape. To prevent the liquid light metal material from escaping with the air from the venting area 29, the venting area is, as set forth above, tempered to a much lower temperature than the other areas of the casting mold 3. In addition, a temperature-controlled or tempered labyrinth-like structure 30 is provided in the venting area 29, which makes it more difficult for the liquid light metal material to escape from the mold cavity 14. In addition or as an alternative to the labyrinth-like structure 30, the venting area 29 may also have cross-sectional changes, surface enlargements, or surface reductions and/or deflections. The venting area 29 or a venting element forming the venting area 29 can be made of a different material than the other components of the casting mold 3. For example, copper materials such as brass or bronze can be used for the venting area 29. Venting areas that are the same or similar to the venting area 29 can also be located at other points in the mold cavity 14.

The venting area 29, which may also be termed a venting unit, enables a system that causes the liquid light metal material to be contained through its own heat management in conjunction with the geometric design described, so that, depending on the requirements, a connection to the vacuum unit 27 can be controlled selectively with full cross-section or reduced cross-section via one or more holes 31 to be able to use short venting distances. In some cases, these venting areas 29 can also be provided with a vacuum valve connection or can also be used without a subsequent vacuum connection to serve as a complete or partial overflow for the casting mold 3.

FIG. 12 also shows a closed belt or ring 32, which is formed by offsetting the planes of the rigid mold half 4. In the closed state of the casting mold 3 the tuning elements 28 rest against the ring 32 to guarantee the tightness of the casting mold 3. The ring 32 thus absorbs the forces occurring during casting.

Figure 13:
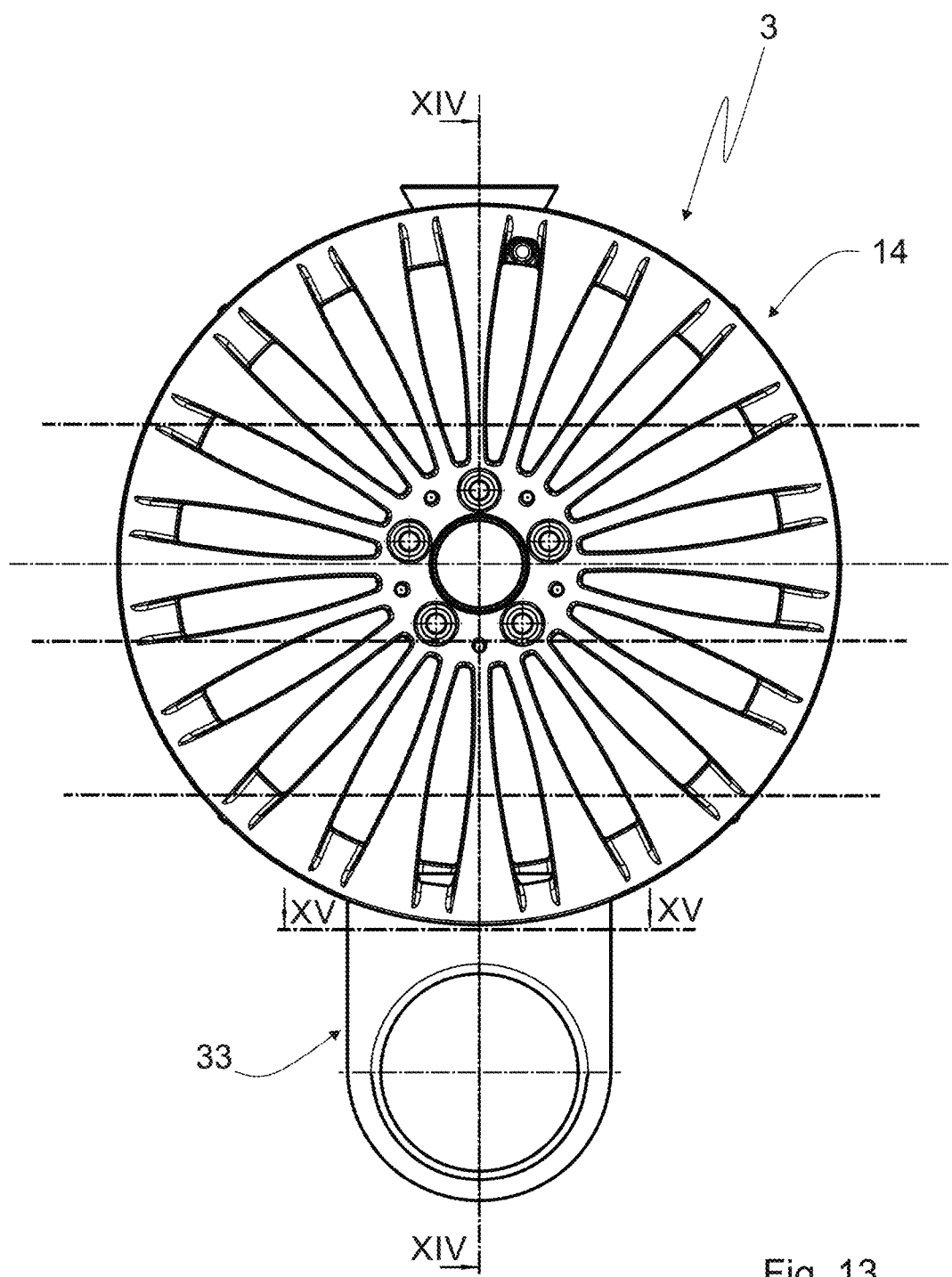
FIG. 13 is a top view of a further embodiment of the disclosed casting mold for casting a vehicle wheel.

FIG. 13 shows a further embodiment of the casting mold 3 for casting the vehicle wheel 2. As noted above, the vehicle wheel 2 is produced by introducing molten material, preferably a light metal material and in particular a cast aluminum alloy, into the mold cavity 14 of the casting mold 3 and subsequent solidification of the molten material. Since in the states shown in FIGS. 14-18 the molten material forming the vehicle wheel 2 is already inside the mold cavity 14 of the casting mold 3, FIGS. 14-18 are at the same time to be regarded as sections through the vehicle wheel 2. The vehicle wheel 2 shown in FIGS. 14-18 is to be regarded as only one of many possible embodiment examples.

The casting mold 3 further has a gate region 33 adjacent to the mold cavity 14, via which the molten material is fed to the mold cavity 14 to form the vehicle wheel 2. The gate region can also be called ingate region 33 or deadhead region 33.

Here, the ratio between the smallest cross-sectional area of the gate region 33 and the volume of the mold cavity 14 is at least 0.6 mm$^2$/cm$^3$. Preferably, this ratio is at most 1.4 mm$^2$/cm$^3$. In principle, the ratio between the smallest cross-sectional area of the gate region 33 and the volume of the mold cavity 14 can also be at least 0.7 mm$^2$/cm$^3$ and at most 1.5 mm$^2$/cm$^3$, but the above-mentioned values of at least 0.6 mm$^2$/cm$^3$ and at most 1.4 mm$^2$/cm$^3$ have proven to be more suitable in trials with regard to uniform flow into and through the casting mold 3.

The aforementioned relationship between the smallest cross-sectional area of the gate region 33 and the volume of the mold cavity 14 can be understood or referred to as a modulus. In the context of the present disclosure, the modulus links an area dimension [mm$^2$], namely the smallest cross-sectional area of the gate region 33, to a volume dimension [cm$^3$], namely the volume of the mold cavity 14. In this context, the modulus has the dimension of an inverted length. Furthermore, the unit mm$^2$/cm$^3$ is equivalent to the unit 1/m.

For example, if the mold cavity 14 has a volume of 7000 cm$^3$, the modulus can be selected from an interval between 0.6 mm$^2$/cm$^3$ and 1.4 mm$^2$/cm$^3$, for example with the value 0.8 mm$^2$/cm$^3$, or the modulus lies within this range. Thus, in the present example, for the design of the smallest cross-sectional area of gate region 33, starting from a volume of 7000 cm$^3$ times the modulus of 0.8 mm$^2$/cm$^3$ results in a cross-sectional area of 5600 mm$^2$ as a target. These values represent only an example of a specific embodiment.

Preferably and as described above, the molten material is introduced into the mold cavity 14 at a casting piston velocity of more than 5 m/s. The direction of the force with which a casting piston (not shown) presses the molten material over the gate region 33 into the mold cavity 14 of the casting mold 3 is indicated by the arrow F in FIG. 14. As a result, the molten material flows through the mold cavity 14 at a velocity of more than 15 m/s, where, with a view to preventing rupture of the casting front, it is preferable if the velocity of the molten material does not exceed 70 m/s in those cross-sections of the mold cavity 14 which are critical for achieving a satisfactory component. In other words, in certain cross-sections which are not decisive for the quality of the vehicle wheel to be produced, the flow velocity of the molten material may well exceed the 70 m/s mentioned.

Figure 14:
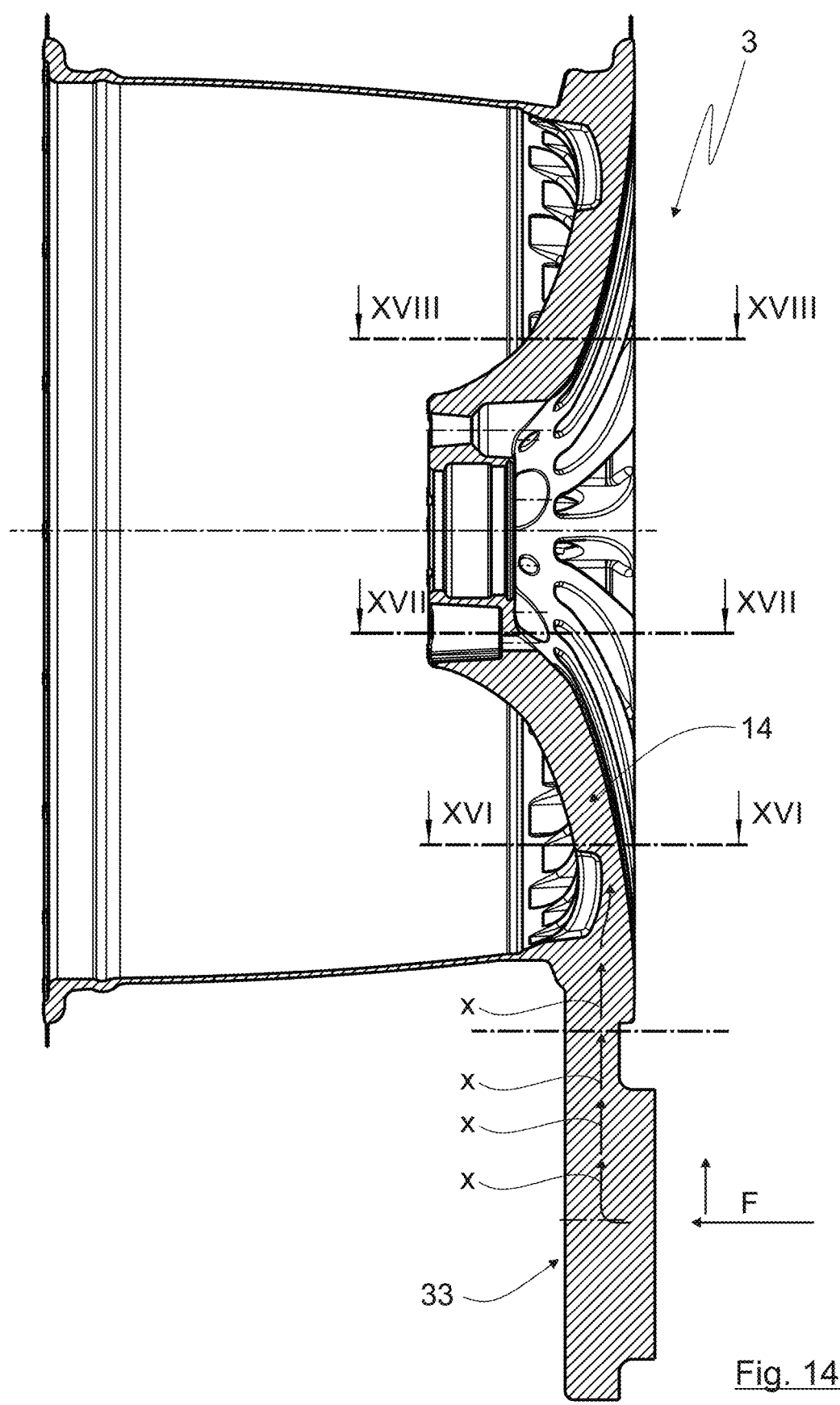
FIG. 14 is a section along line XIV-XIV from FIG. 13.
Figure 15:
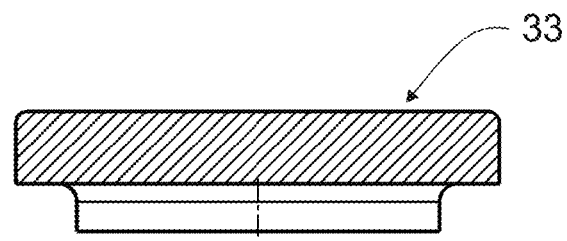
FIG. 15 is a section along line XV-XV from FIG. 13.
Figure 16:
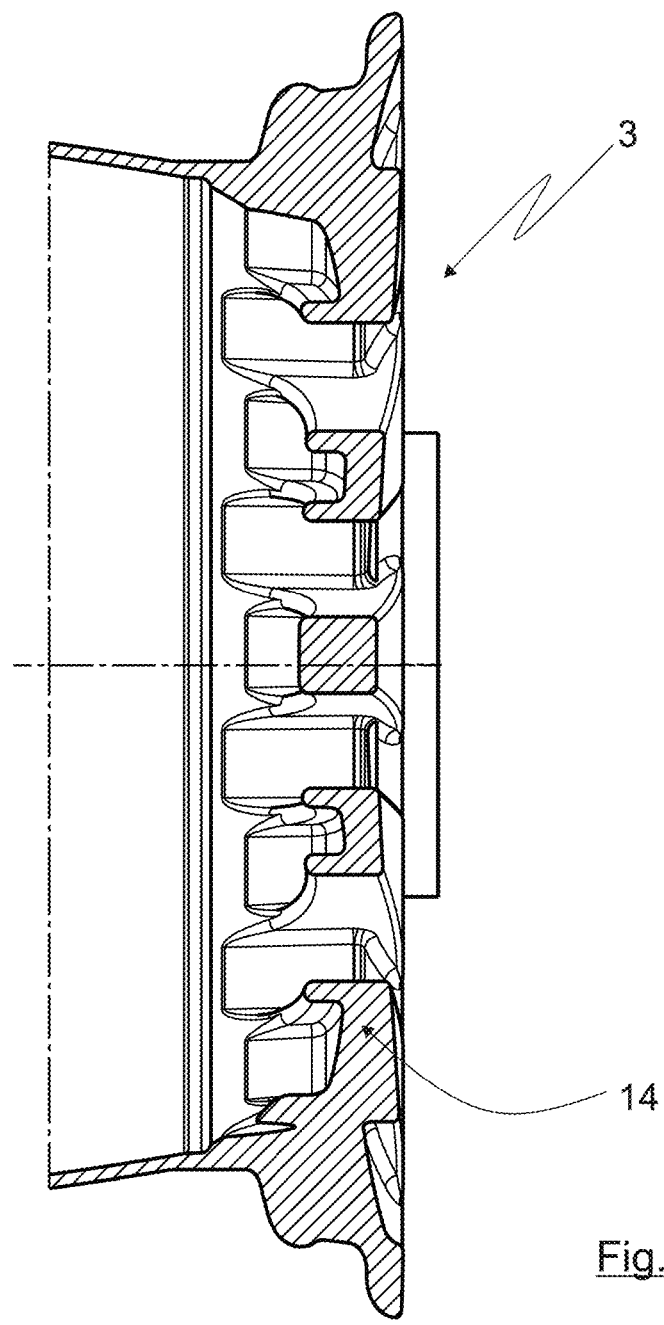
FIG. 16 is a section according to line XVI-XVI from FIG. 14.
Figure 17:
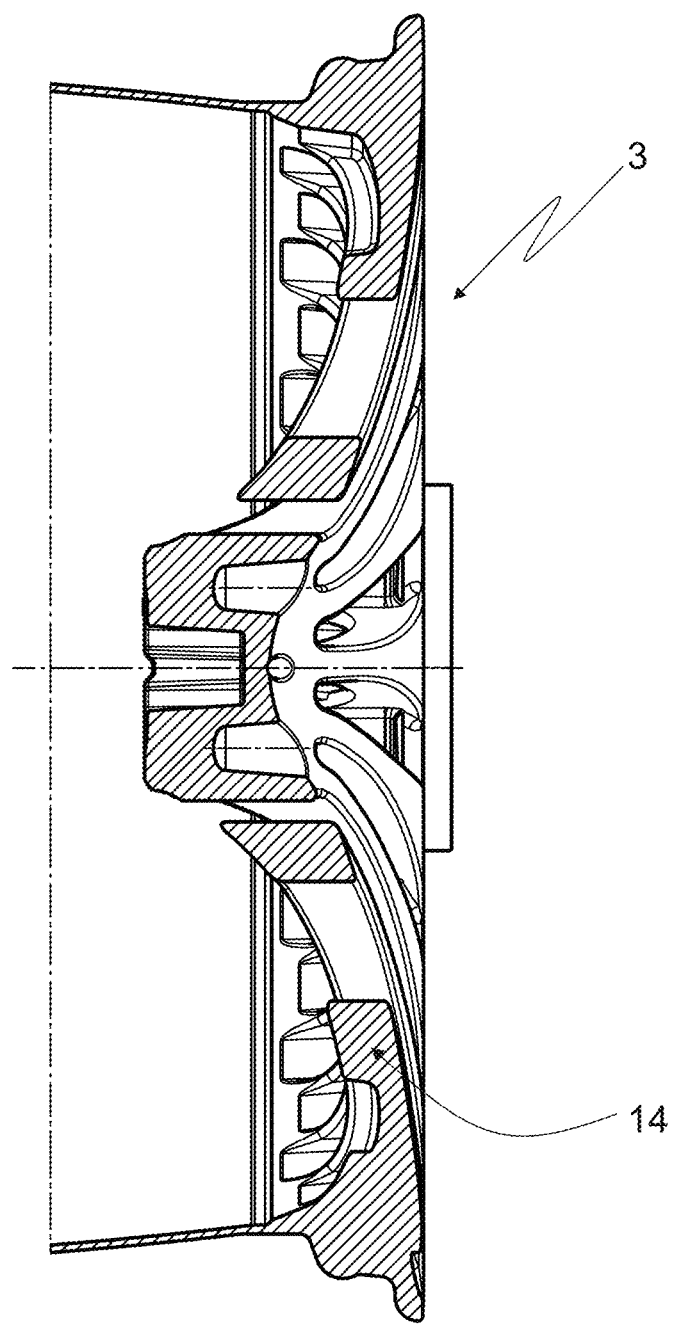
FIG. 17 is a section along line XVII-XVII from FIG. 14.
Figure 18:
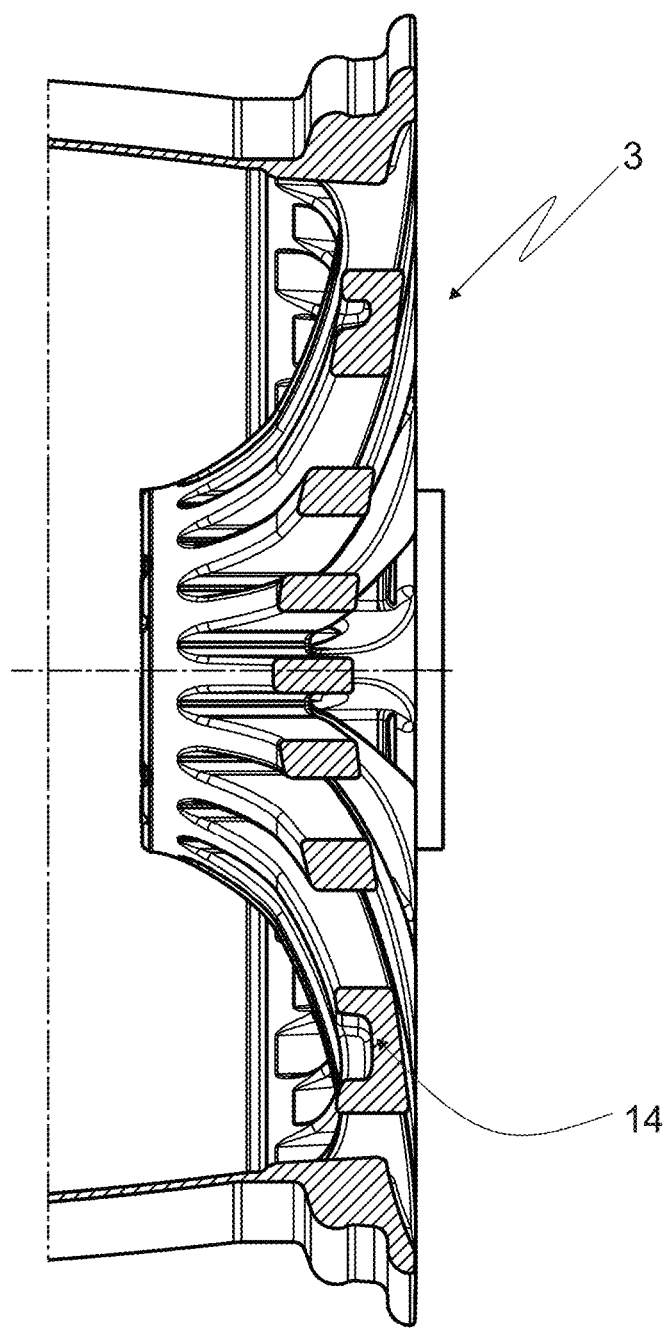
FIG. 18 is a section along line XVIII-XVIII from FIG. 14.

In FIG. 14, the casting direction or the main flow direction of the molten material is shown by several arrows, some of which are marked with x. The smallest cross-sectional area of the gate region 33 is measured in a plane perpendicular to the main flow direction x of the molten material. This smallest cross-sectional area of gate region 33 is shown by the hatching in FIG. 15.

Viewed in the main flow direction x of the molten material, the cross-sectional area of the gate region 33 is preferably constant or increasing. Accordingly, one embodiment of the gate region 33 may be that, measured in a direction perpendicular to the main flow direction x of the molten material, all cross-sectional planes of the gate region 33 are approximately equal in size.

Starting from the gate region 33, the cross-sectional area of the mold cavity 14, viewed in the main flow direction x of the molten material, is preferably made equal or increasing up to a depth of at least 60% of the total depth of the mold cavity 14. These constant or increasing cross-sections of the mold cavity 14 can also be present up to a depth of 80% of the total depth of the mold cavity 14. Only in the last 20-40% of the area of the mold cavity 14 facing away from the gate region 33 can the cross-sectional area of the mold cavity 14 thus decrease.

For all of the above conditions, the mold cavity 14 and thus the vehicle wheel 2 produced with the casting mold 3 can be adapted to specific requirements or conditions.

The previous description of the disclosed embodiments is provided to enable any person skilled in the art to make or use the invention disclosed herein. Although the various inventive aspects are disclosed in the context of one or more illustrated embodiments, implementations, and examples, it should be understood by those skilled in the art that the invention extends beyond the specifically disclosed embodiments to other alternative embodiments and/or uses of the invention and obvious modifications and equivalents thereof. It should be also understood that the scope of this disclosure includes the various combinations or sub-combinations of the specific features and aspects of the embodiments disclosed herein, such that the various features, modes of implementation, and aspects of the disclosed subject matter may be combined with or substituted for one another. The generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

All references cited are hereby expressly incorporated herein by reference.

What is claimed is:

1. A method of producing a vehicle wheel from a light metal material comprising introducing a light metal material in liquid form into a mold cavity of a casting mold via a gate region adjoining the mold cavity,
    wherein the vehicle wheel is produced using pressurized casting,
    wherein in areas in which the vehicle wheel has a smaller cross-section, the casting mold is tempered to higher temperatures, and in areas in which the vehicle wheel has a larger cross-section, the casting mold is tempered to lower temperatures,
    wherein the light metal material is in a liquid state and is introduced into the mold cavity at a casting piston speed of more than 5 m/s and a pressure of less than or equal to 100 bar, and
    wherein a ratio or modulus between the smallest cross-sectional area of the gate region and the volume of the mold cavity is at least 0.6 $mm^2/cm^3$, and,
    wherein the wall thickness of the vehicle wheel that is produced is less than or equal to 1 mm in at least some areas.

2. The method of claim 1, the casting mold has a rigid mold half, a movable mold half, an upper slide, and a lower slide,
    wherein the upper slide and the lower slide are movable by corresponding gripping elements in a direction perpendicular to a closing direction of the casting mold, and
    wherein when the movable mold half is moved relative to the rigid mold half against the closing direction, the upper slide and the lower slide are also moved against the closing direction relative to the rigid mold half.

3. The method of claim 1, wherein a venting area, in which the casting mold is vented, is tempered to a lower temperature than other areas of the casting mold.

4. The method of claim 1, wherein the ratio or modulus is at most 1.4 $mm^2/cm^3$.

5. The method of claim 1, wherein the light metal material flows through the mold cavity at a speed of more than 15 m/s.

* * * * *